US010331972B2

(12) United States Patent
Sasaki et al.

(10) Patent No.: US 10,331,972 B2
(45) Date of Patent: Jun. 25, 2019

(54) SURVEY DATA PROCESSING DEVICE, SURVEY DATA PROCESSING METHOD, AND PROGRAM THEREFOR

(71) Applicant: KABUSHIKI KAISHA TOPCON, Itabashi-ku (JP)

(72) Inventors: Daisuke Sasaki, Itabashi-ku (JP); Nobuyuki Fukaya, Itabashi-ku (JP); Hitoshi Ootani, Itabashi-ku (JP); Tetsuji Anai, Itabashi-ku (JP); Takeshi Sasaki, Itabashi-ku (JP)

(73) Assignee: KABUSHIKI KAISHA TOPCON, Itabashi-Ku (JP)

( * ) Notice: Subject to any disclaimer, the term of this patent is extended or adjusted under 35 U.S.C. 154(b) by 0 days.

(21) Appl. No.: 15/008,632

(22) Filed: Jan. 28, 2016

(65) Prior Publication Data
US 2016/0217589 A1 Jul. 28, 2016

(30) Foreign Application Priority Data

Jan. 28, 2015 (JP) .................................. 2015-014291

(51) Int. Cl.
G01C 11/06 (2006.01)
G06K 9/00 (2006.01)
(Continued)

(52) U.S. Cl.
CPC ............ G06K 9/6202 (2013.01); G01C 11/06 (2013.01); G01C 21/005 (2013.01);
(Continued)

(58) Field of Classification Search
CPC ................ G06K 9/0063; G06K 9/6202; G06T 2207/10044; G06T 2207/20076;
(Continued)

(56) References Cited

U.S. PATENT DOCUMENTS 3,064,249 A * 11/1962 Forbath ................ G01C 21/005
340/5.1
5,136,297 A * 8/1992 Lux ...................... G01C 21/005
342/33
(Continued)

FOREIGN PATENT DOCUMENTS

JP 2013-96745 5/2013

OTHER PUBLICATIONS

Extended European Search Report dated Jun. 27, 2016 in Patent Application No. 16152535.7.
(Continued)

Primary Examiner — Vincent Rudolph
Assistant Examiner — Pinalben V Patel
(74) Attorney, Agent, or Firm — Xsensus LLP

(57) ABSTRACT

A technique for making multiple still images, which are photographed by a traveling mobile body, and the traveled route of the photographing correspond to each other, is obtained. A survey data processing device includes an input unit 101, an image processing unit 102, and a synchronous processing unit 103. The input unit 101 is configured to receive image data of multiple still images, which are photographed from a mobile body flying, and receive flight data, in which a flight route of the mobile body is measured. The image processing unit 102 is configured to estimate a flight route of the mobile body based on changes in positions of feature points included in the multiple still images on a screen. The synchronous processing unit 103 is configured to specify a matching relationship between the flight route of the flight data and the estimated flight route.

6 Claims, 8 Drawing Sheets

(51) Int. Cl.
*G06K 9/62* (2006.01)
*G06T 7/246* (2017.01)
*G01C 21/00* (2006.01)

(52) U.S. Cl.
CPC ............ *G06K 9/0063* (2013.01); *G06T 7/248* (2017.01); *B64C 2201/123* (2013.01); *G06T 2207/10044* (2013.01); *G06T 2207/20076* (2013.01); *G06T 2207/30241* (2013.01)

(58) Field of Classification Search
CPC .......... G06T 7/248; G06T 2207/30241; G01C 11/06; G01C 21/005; B64C 2201/123
See application file for complete search history.

(56) References Cited

U.S. PATENT DOCUMENTS

| | | | | |
|---|---|---|---|---|
| 7,333,651 | B1* | 2/2008 | Kim | G06K 9/6202 345/419 |
| 7,469,183 | B2* | 12/2008 | Bodin | G05D 1/0027 701/23 |
| 9,013,576 | B2* | 4/2015 | Ohtomo | G01C 11/02 348/142 |
| 2012/0300070 | A1* | 11/2012 | Ohtomo | G01C 11/02 348/144 |
| 2013/0085661 | A1* | 4/2013 | Chan | G05D 1/104 701/122 |
| 2013/0110387 | A1* | 5/2013 | Castillo-Effen | G08G 5/0095 701/120 |
| 2014/0316616 | A1* | 10/2014 | Kugelmass | G05D 1/101 701/8 |
| 2016/0379375 | A1* | 12/2016 | Lu | G06K 9/00201 382/103 |
| 2017/0069214 | A1* | 3/2017 | Dupray | G08G 5/0021 |
| 2017/0293796 | A1* | 10/2017 | Li | B64C 39/024 |

OTHER PUBLICATIONS

Dan Alix, et al., "Error characterization of flight trajectories reconstructed using structure from motion", Airforce Institute of Technology, National Reconnaissance Office, XP032572073, Oct. 23, 2013, pp. 1-15.

M. K. Kaiser, et al., "Vision-based estimation for guidance, navigation, and control of an aerial vehicle", IEEE Transactions on Aerospace and Electronic Systems, vol. 46, No. 3, XP011316258, Jul. 1, 2010, pp. 1064-1077.

F. Zhang, et al., "Obstacle detection for low flying UAS using monocular camera", IEEE, XP032451413, May 13, 2012, 5 Pages.

Gianpaolo Conte, et al. "An integrated UAV navigation system based on aerial image matching", IEEE, IEEEAC Paper #1276, Version1, XP031256426, Mar. 1, 2008, pp. 1-10.

Peter Cho et al: "3D exploitation of 2D•grounc:Hevel •& aeriar imagery", Applied Imagery Pattern Recognition Workshop (AIPR), 2011 IEEE, IEEE, Oct. 11, 2011 (Oct. 11, 2011), pp. 1-8, XP032154224, DOI: 10.1109/AIPR.2011.6176363 ISBN: 978-1-4673-0215-9.

European Office Action dated Oct. 17, 2018, in corresponding European Application No. 16152535.

* cited by examiner

SURVEY DATA PROCESSING DEVICE, SURVEY DATA PROCESSING METHOD, AND PROGRAM THEREFOR

BACKGROUND OF THE INVENTION

Technical Field

The present invention relates to a surveying technique.

Background Art

For example, a technique for obtaining a three-dimensional model of the topography of an object based on image data (three-dimensional topographic data in which the topography of the object is modeled as electronic data) is publicly known (for example, refer to Japanese Unexamined Patent Application Laid-Open No. 2013-96745). The image data may be obtained by photographing a civil engineering worksite or the like from the air. In such a technique, information of photographing locations must be linked with the photographing data.

In the above technique, a method of using an autonomously flying unmanned air vehicle (UAV) equipped with a camera may be used. In this case, the clock included in the camera is synchronized with a GNSS unit (location identifying unit using a navigation satellite) and an IMU (inertial navigation unit), which are mounted on the UAV. Then, a relationship between an obtained still image (frame image in the case of using a moving image) and a location and an attitude of the camera (UAV) is obtained.

SUMMARY OF THE INVENTION

However, considering the costs, the weights mountable on a UAV, and the amounts of electricity consumed, there may be cases of using hardware in which photographed still images and the flight route cannot be synchronized with each other. In such cases, processing for making the obtained image data and the flight route correspond to each other is necessary. This processing is conventionally performed by manual operation, but it is complicated to perform this processing on each of several hundred or more still images, and therefore, improvements are desired. In view of these circumstances, an object of the present invention is to provide a technique for making multiple still images, which are photographed by a camera that is traveling, and the traveled route of the photographing correspond to each other.

A first aspect of the present invention provides a survey data processing device including an input unit, a flight route estimating unit, and a matching relationship specifying unit. The input unit receives image data of multiple still images, which are photographed from a mobile body flying, and receives flight data, in which a flight route of the mobile body is measured. The flight route estimating unit estimates a flight route of the mobile body based on changes in positions of feature points included in the multiple still images on a screen. The matching relationship specifying unit specifies a matching relationship between the flight route of the flight data and the estimated flight route.

When photographing is performed consecutively from a mobile body, and the obtained still images are arranged in the time sequence order, photographed objects seem to move gradually between the frames of the still images. This is because the photographed area is gradually shifted in accordance with the movement of the camera. This is the same principle as in the case in which scenery outside a train window appears to move rearward. Here, considering a specific feature point included in the image, when the movement of the specific feature point is visually tracked, it corresponds to the movement of the camera. Therefore, by analyzing the movement of a feature point in the image, a relative movement route of the camera can be estimated. In this method, since a true scale is not provided, the estimated route is a relative model. In view of this, in the present invention, the estimated route and a traveled route obtained in a mobile body (obtained by a GNSS unit, for example) are compared with each other so as to match trajectories thereof, whereby a matching relationship therebetween is obtained. After the two routes are made to coincide with each other (or have a relationship which can be recognized as correspondence), a relationship between the traveled route and the obtained still images is determined. That is, a matching relationship between the multiple still images, which are obtained by photographing by a camera that is traveling, and the traveled route of the photographing, is determined.

According to a second aspect of the present invention, in the first aspect of the present invention, the flight route estimating unit may perform a processing for obtaining a moving-direction vector, which characterizes a movement of the feature point on the screen, and a processing for estimating the flight route based on the moving-direction vector.

According to a third aspect of the present invention, in one of the first and the second aspects of the present invention, the matching relationship specifying unit may calculate a location of the estimated flight route so that a total of distances between vectors indicating the estimated flight route and vectors indicating the flight route of the flight data be minimum.

A fourth aspect of the present invention provides a survey data processing method including: receiving image data of multiple still images, which are photographed from a mobile body flying, and flight data, in which a flight route of the mobile body is measured, estimating a flight route of the mobile body based on changes in positions of feature points included in the multiple still images on a screen, and specifying a matching relationship between the flight route of the flight data and the estimated flight route.

A fifth aspect of the present invention provides a computer program product including a non-transitory computer-readable medium storing computer-executable program codes. The computer-executable program codes include program code instructions for: receiving image data of multiple still images, which are photographed from a mobile body flying, and flight data, in which a flight route of the mobile body is measured, estimating a flight route of the mobile body based on changes in positions of feature points included in the multiple still images on a screen, and specifying a matching relationship between the flight route of the flight data and the estimated flight route.

According to the present invention, a technique for making multiple still images, which are obtained by photographing by a camera that is traveling, and the traveled route of the photographing correspond to each other is obtained.

PREFERRED EMBODIMENTS OF THE INVENTION

Outline

In this embodiment, an autonomously flying unmanned air vehicle (UAV) with a piece of equipment mounted with a camera is used. The UAV is equipped with a GNSS unit (location identifying unit using a navigation satellite) and an IMU (inertial navigation unit), and it is capable of autonomous flight. The UAV consecutively photographs a ground surface by the camera while flying. Specifically, the UAV consecutively performs processing of photographing a first still image at time t1, a second still image at time t2, and a third still image at time t3 while flying. The interval of the photographing is determined as needed, and for example, it may be 2 seconds. Alternatively, a moving image may be photographed, and frame images constructing the moving image may be used as still images. That is, a moving image is constructed of multiple frame images that are aligned on a time axis, such as of a first frame image photographed at time t1, a second frame image photographed at time t2, and so on, and therefore, the frame images may be used as still images in this embodiment.

In the photographing, since the photographing is performed while flying, the positions of viewpoints shift little by little, whereby numerous still images including photographed areas that slightly differ from each other are obtained. The camera is equipped with a clock and records the photographing time, whereby image data of photographed still images, which are respectively linked with its photographing time, is obtained. The UAV has a function of recording data relating to the flight route that is measured by the GNSS unit and the IMU.

In this embodiment, the UAV records location information of the flight route at an interval of 0.2 seconds by using the GNSS. The data recording the flight route can be output from the UAV to the outside as log data after the flight. Meanwhile, the camera photographs still images at an interval of 2 seconds and stores the image data. The UAV and the camera are respectively equipped with a clock, but the clocks thereof are not synchronized with each other. Therefore, when the flight is completed, immediately after the image data, and the log data relating to the flight route, are respectively obtained from the camera and the UAV, the image data and the log data relating to the flight route do not correspond to each other. This embodiment relates to a technique of making the image data and the flight route correspond to each other by software processing.

Structure

Figure 1:
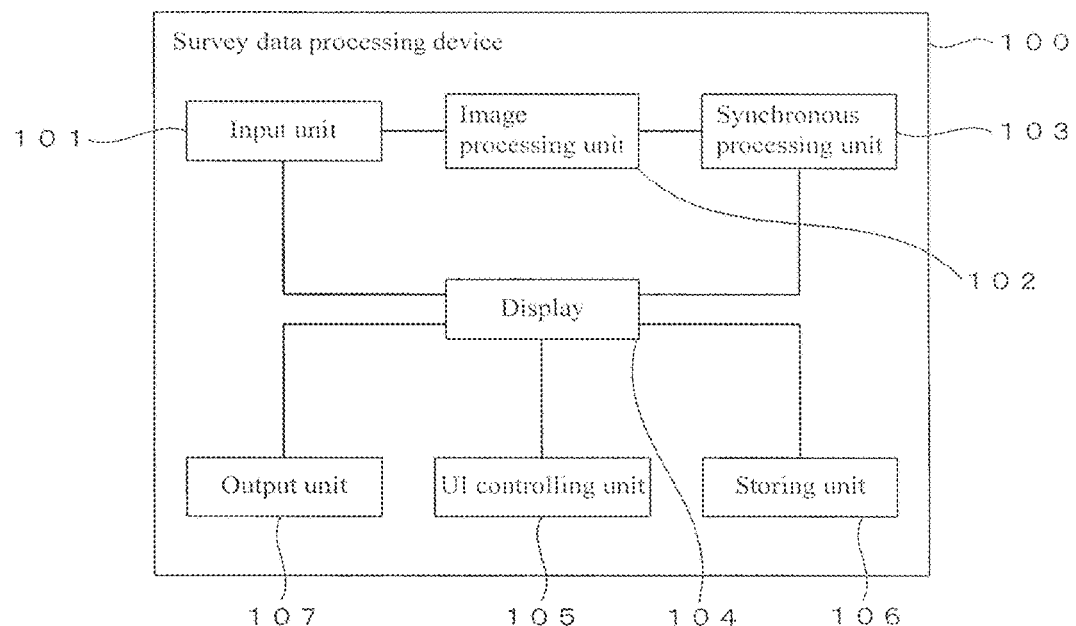
FIG. 1 is a block diagram of an embodiment.

FIG. 1 shows a survey data processing device 100 for performing a processing for calculating the relationship between the image data obtained from the camera and the flight route data obtained from the UAV. The survey data processing device 100 shown in FIG. 1 functions as a computer and includes a CPU, a solid electronic memory, a hard disk storage unit, various types of interfaces, and other arithmetic elements as necessary. FIG. 1 shows each kind of the functioning units, which are understood as functions. One or more of each kind of the functioning units shown in FIG. 1 may be constructed of software or may be constructed of dedicated hardware.

For example, the survey data processing device 100 may be constructed of dedicated hardware, or the functions of the functioning units shown in FIG. 1 may be performed by software by using a general purpose computer. In the case of using a general purpose computer, images (described later) are displayed on a display provided to or connected to the computer, and the operator performs various kinds of operations by using a UI (User Interface) that can be used in the computer. In addition, at least some of the functions of the survey data processing device 100 may be performed by a tablet computer (tablet terminal) or a smartphone.

The survey data processing device 100 includes an input unit 101, an image processing unit 102, a synchronous processing unit 103, a display 104, a UI (User Interface) controlling unit 105, a storing unit 106, and an output unit 107.

Figure 2:
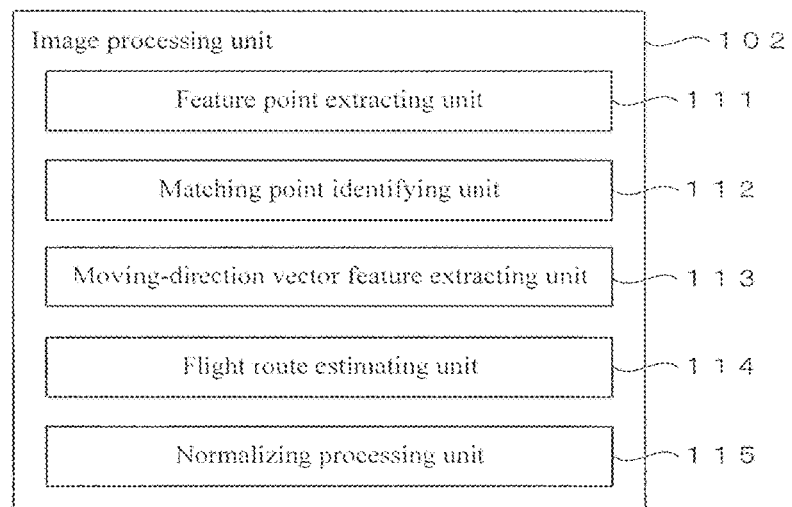
FIG. 2 is a block diagram of an image processing unit.

Image data of images, which are photographed by the camera mounted on the UAV while flying, log data (data of flight route recorded) of the UAV, and data relating to a tilt of the UAV measured by the IMU, are input to the input unit 101. The image processing unit 102 performs a processing for estimating the flight route of the UAV based on multiple still images, which are photographed by the UAV while flying. FIG. 2 shows a block diagram of the image processing unit 102. The image processing unit 102 includes a feature point extracting unit 111, a matching point identifying unit 112, a moving-direction vector feature extracting unit 113, a flight route estimating unit 114, and a normalizing processing unit 115.

The feature point extracting unit 111 extracts feature points from the still images. As the feature points, points that can be differentiated from surroundings, for example, edge portions and portions having colors that are different from surroundings, are extracted. The extraction of the feature points is performed by software processing using a differential filter such as a Sobel filter, a Laplacian filter, a Prewitt filter, a Roberts filter, or the like.

The matching point identifying unit 112 identifies matching relationships between the feature points, which are extracted respectively from two still images. That is, the matching point identifying unit 112 performs a processing for identifying feature points, which are extracted from one still image, with feature points in another still image. This processing for identifying the matching relationships of the feature points is performed by using the template matching shown in FIG. 4, for example.

Figure 4:
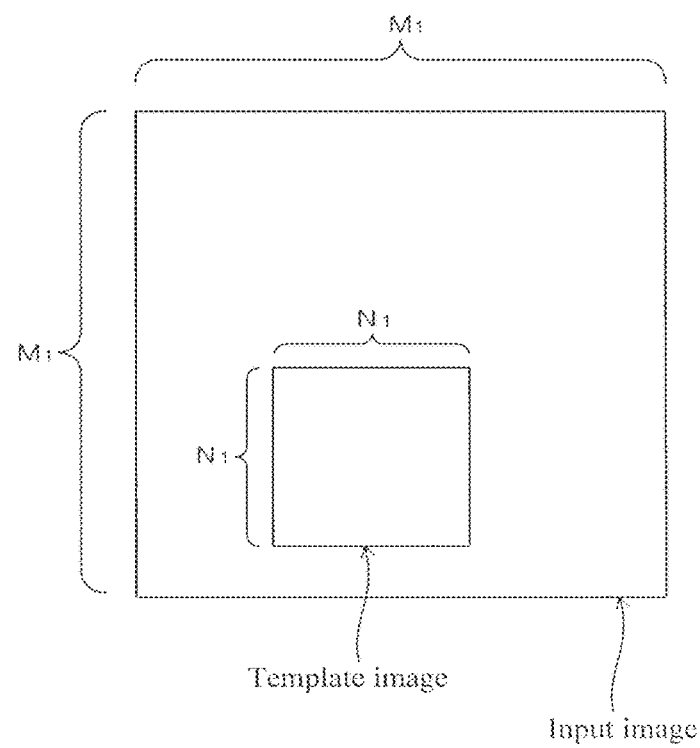
FIG. 4 is an explanatory diagram showing a principle of template matching.

As the template matching, a SSDA method (Sequential Similarity Detection Algorithm), a cross-correlation coefficient method, or the like may be used. An example of the template matching will be described below. The template matching is a method in which coordinate data of images in two coordinate systems are compared with each other and a matching relationship between the two images is calculated by correlation relationship between the coordinate data. In the template matching, the matching relationship between feature points of two images seen from different viewpoints is calculated. FIG. 4 is an explanatory diagram for explaining the principle of the template matching. In this method, as shown in FIG. 4, a template image of $N_1 \times N_1$ pixels is moved on a search range $(M_1 - N_1 + 1)^2$ within an input image of $M_1 \times M_1$ pixels which is larger than the template image, and an upper left position of the template image is calculated so that the cross-correlation function C(a, b) denoted by the following First Formula represent the maximum value (that is, the correlation degree becomes maximum).

First Formula $$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma ab} T_\sigma}}$$

$$\text{Here, } \bar{I} = \frac{1}{N_1^2} \sum_{m_1=0}^{N_1-1} \sum_{n_1=0}^{N_1-1} I_{(a,b)}(m_1, n_1)$$

$$\bar{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \bar{I}\}^2$$

$$T_\sigma = \frac{1}{N_1^2} \sum_{m_1=0}^{N_1-1} \sum_{n_1=0}^{N_1-1} \{T(m_1, n_1) - \bar{T}\}^2$$

$I_{(a,b)}(m_1, n_1)$: Local image of input image
$T(m_1, n_1)$: Template image

The above processing is performed by changing the magnification of the one image and rotating the one image. In a condition in which the correlation degree is the maximum, the matched region of both images is calculated, and feature points in this region are extracted, whereby matching points are detected.

By using the template matching, a portion that matches between two compared images can be identified, and the matching relationship between the two images can be calculated. In this method, the relative positional relationship between the two images is calculated so that the degree of the correlation relationship between the two images can be the maximum. The correlation relationship between the two images is calculated based on the feature points of the two images.

The moving-direction vector feature extracting unit 113 extracts features of vectors correlating the movement of the UAV (camera), based on changes in the still images, which are generated due to the elapse of time. The vectors are called "moving-direction vectors". By calculating trajectories of the moving-direction vectors in accordance with the elapse of time, a relative flight route of the UAV is calculated.

Figure 8:
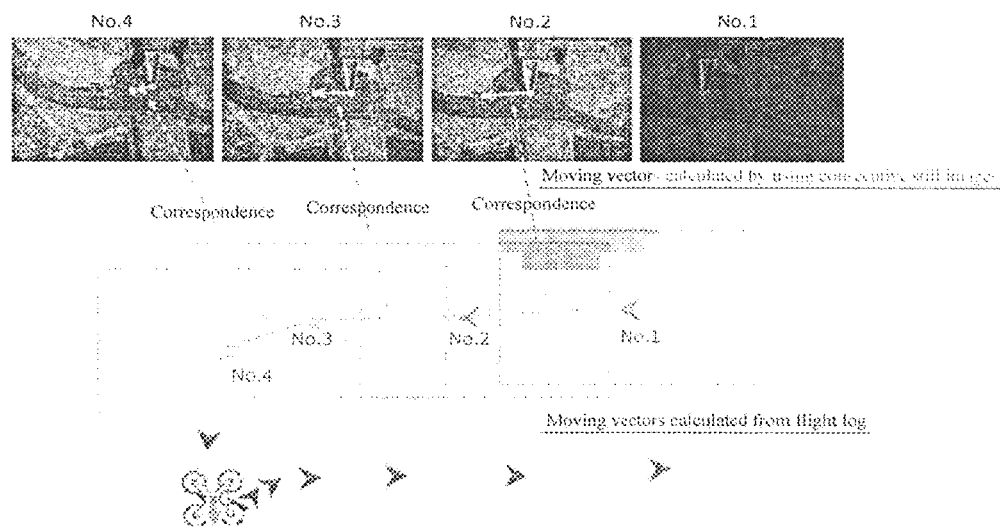
FIG. 8 is a view showing a relationship between still images and a traveled route.

The processing performed by the moving-direction vector feature extracting unit 113 will be described hereinafter. First, to provide background information, a relationship between a still image obtained at each time and an actual flight route is described. FIG. 8 shows corresponding relationships between still images shifted and movement vectors obtained from the log data of the UAV. FIG. 8 shows consecutive still images Nos. 1 to 4, showing conditions in which the photographed location is slightly shifted every moment as the UAV flies. The flight route (changes in the movement vectors) obtained from the log data of the UAV is shown under the consecutive still images Nos. 1 to 4.

As shown in FIG. 8, changes in the still images correspond to the movement in the flight route. By using this phenomenon, the moving-direction vector feature extracting unit 113 performs a processing for obtaining moving-direction vectors, which characterize movement in the still images relative to the camera, by analyzing the still images.

Figure 5:
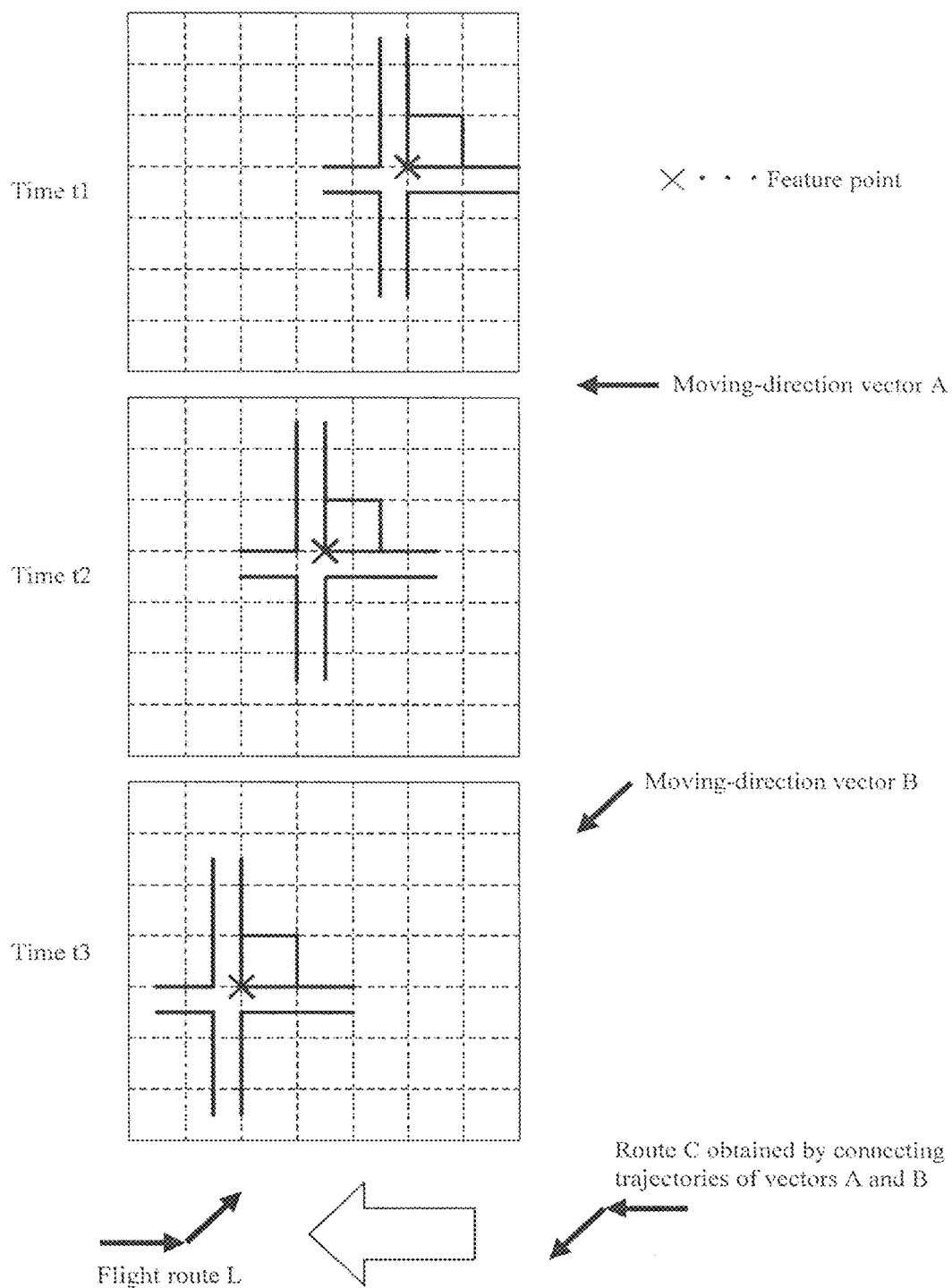
FIG. 5 is an explanatory diagram showing a principle of a processing for estimating a flight route from images.

FIG. 5 schematically shows still images, which are respectively obtained at times t1, t2, and t3, and the times t1, t2, and t3 passed in this order. The still images shown in FIG. 5 show a simplified crossroad with a building standing on a corner. FIG. 5 shows a case in which a feature point X moved leftward from time t1 to time t2 and then further moved to a lower left side from time t2 to time t3.

In this case, the moving-direction vector feature extracting unit 113 focuses on the feature point X and extracts changes in the location thereof. For example, in this case, by comparing the still image at the time t1 with the still image at the time t2, a moving-direction vector A is obtained as a vector indicating the moving direction and the moving distance of the feature point X. Then, by comparing the still image at the time t2 with the still image at the time t3, a moving-direction vector B is obtained as a vector indicating the moving direction and the moving distance of the feature point X. Thereafter, the trajectories of the moving-direction vectors A and B are connected with each other, whereby a route C is obtained. Thus, by comparing each still image with a next still image that is photographed in a consecutive manner, moving-direction vectors (for example, the moving-direction vectors A and B shown in FIG. 5) for characterizing changes in the still images is obtained.

The flight route estimating unit 114 estimates the flight route of the UAV (traveled route of the camera) based on the moving-direction vectors. For example, considering the route C shown in FIG. 5, the UAV moves along a route that is the reverse of the route indicated by the moving-direction vectors A and B relative to the ground surface. Therefore, the flight route of the UAV from the times t1 to t3 is indicated as shown by the flight route L. Although the above is described in the case of three instances of the times t1, t2, and t3, the trajectory of the flight route of the UAV is estimated by further performing the same processing on still images that are obtained at multiple times. The above processing is performed by the flight route estimating unit 114.

The estimated flight trajectory obtained at this stage does not have a true scale, and therefore, it is relative. That is, in the flight route obtained in accordance with the principle shown in FIG. 5, data relating to the flight distance is not included.

The normalizing processing unit 115 shown in FIG. 2 enlarges and reduces the estimated flight trajectory of the UAV, which is estimated by the flight route estimating unit 114, so as to adjust the difference in the scale from the actual flight route of the UAV, which is obtained from the log data of the UAV. That is, since the estimated flight route of the UAV obtained by the flight route estimating unit 114 is a relative flight trajectory that is not provided with a true scale, the scale is adjusted as described above so as to be made to correspond to the scale of the actual flight route obtained from the log data.

Figure 9:
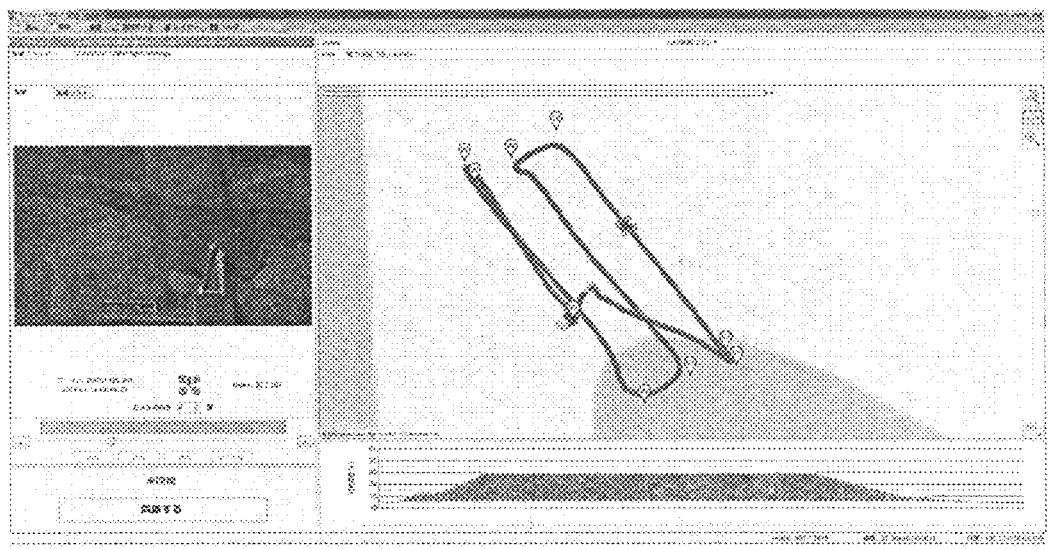
FIG. 9 is a view showing an example of a GUI image displayed on a screen.

In general, flight of a UAV may be conducted along a route making a trajectory as shown in FIG. 9. Therefore, the estimated flight trajectory is enlarged or reduced so as to have a scale that is approximately the same as the scale of the actual trajectory as shown in FIG. 9. Thus, a trajectory of the estimated flight route, of which the scale is adjusted so as to be approximately the same as the true scale, is obtained. The above is the processing performed by the normalizing processing unit 115.

Then, to return to FIG. 1, the synchronous processing unit 103 performs a processing for comparing the data of the estimated flight route of the UAV, which is estimated by the image processing unit 102, with the data of the flight route (log data), which is actually recorded by the UAV, and synchronizing (matching) these data with each other.

A specific example of the processing performed by the synchronous processing unit 103 is described below. The synchronous processing unit 103 matches a trajectory of a flight route A of the UAV, which is estimated by the image processing unit 102, with a flight route B, which is actually recorded, by rotating, parallel moving, enlarging, or reducing the flight route A. By performing the matching, the matching relationship between the flight routes A and B is clarified, and which still image was photographed at a specific position in the flight route is identified.

Specifically, since the relationship between the location and the time is determined in the flight route B, when the flight route A and the flight route B are matched with each other, the flight route A (flight route that is estimated by the image analysis) is provided with a true scale, and the relationship between the location and the time is clarified in the flight route A. Then, by clarifying the relationship between the location and the time in the flight route A, information of the photographing times and the photographing locations of the still images for the flight route A is obtained. That is, the photographing time and the photographing location of a specific still image are identified in the image data that is obtained by the camera. The identified data of the photographing time and the photographing location, and the data relating to the tilt of the UAV at the time when the UAV photographed a corresponding image, are added to each image file as header information (for example, a geotag).

The display 104 displays various GUI (Graphical User Interface) images as shown in FIGS. 9 to 14. The display 104 also performs displays, that are necessary for controlling the survey data processing device 100, and displays of various kinds of data. When a notebook computer is used as the survey data processing device 100, the display of the notebook computer may be used as the display 104.

Figure 3:
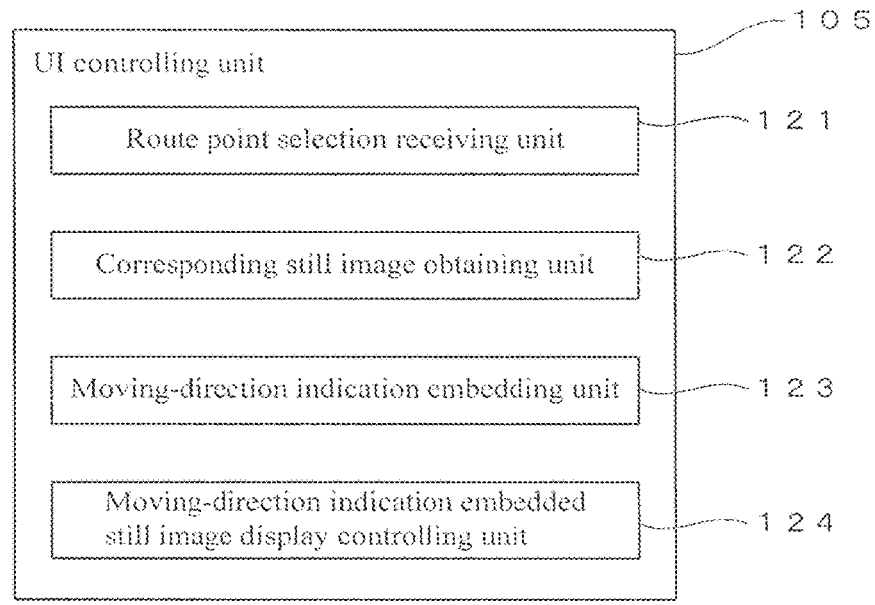
FIG. 3 is a block diagram of a UI controlling unit.

The UI controlling unit 105 controls functions of GUI as shown in FIGS. 9 to 14. FIG. 3 shows a block diagram of the UI controlling unit 105. The UI controlling unit 105 includes a route point selection receiving unit 121, a corresponding still image obtaining unit 122, a moving-direction indication embedding unit 123, and a display controlling unit 124 for displaying a moving-direction indication embedded still image.

Figure 10:
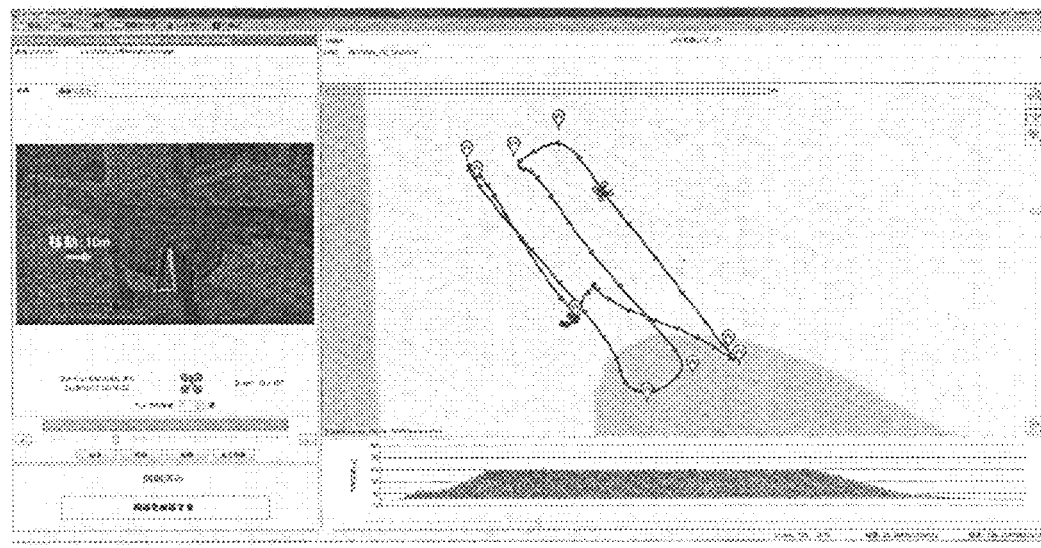
FIG. 10 is a view showing an example of a GUI image displayed on a screen.

The route point selection receiving unit 121 receives the contents when the operator selects a specific point (route point) of the flight route that is obtained from the log data. For example, FIG. 10 shows an example of a GUI image displayed on the display 104. A flight route obtained from the log data is shown on the right side in FIG. 10, and a still image obtained from image data is shown on the left side in FIG. 10. Here, the still image shown on the left side was photographed at a position at a specific point (marker point with a cloverleaf shape) of the flight route on the right side. The position of the marker with the cloverleaf shape can be selected by controlling the GUI by the operator. The contents of the operation are received by the route point selection receiving unit 121.

The corresponding still image obtaining unit 122 obtains a still image (still image photographed by the camera), which corresponds to the specific position of the flight route that is received by the route point selection receiving unit 121, from the image data. The moving-direction indication embedding unit 123 performs a processing for embedding a mark (in the case shown in FIG. 10, an arrow) in the still image that is obtained by the corresponding still image obtaining unit 122, for indicating the moving direction of the UAV (camera). The moving direction of the UAV is calculated by the principle shown in FIG. 5. That is, by comparing still images with each other, which are photographed in a consecutive manner, relative movements of feature points between the still images are detected, and the moving direction and the moving distance of the UAV are calculated therefrom. By this processing, the moving direction and the moving distance of the UAV are calculated based on a starting point in a preceding still image, and they are displayed by an arrow (vector display) in a next still image. This processing is performed by the moving-direction indication embedding unit 123.

The display controlling unit 124 performs controlling for displaying the still image, in which a mark for indicating the moving direction of the UAV is embedded, on the display 104. An example of a still image, which is displayed on the display 104 by the display controlling unit 124, is shown on the left side of FIG. 10.

Then, to return to FIG. 1, the storing unit 106 stores various data, which are necessary for operating the survey data processing device 100, and various data, which are obtained as a result of the operation. For example, the storing unit 106 stores image data obtained by the camera, the log data of the UAV, various kinds of programs for operating the survey data processing device 100, intermediate data to be processed by the survey data processing device 100, and data obtained as a result of the processing. The output unit 107 outputs various data, which are obtained by the survey data processing device 100, and various data, which are used in the survey data processing device 100, to the outside.

Example of Processing

Figure 6:
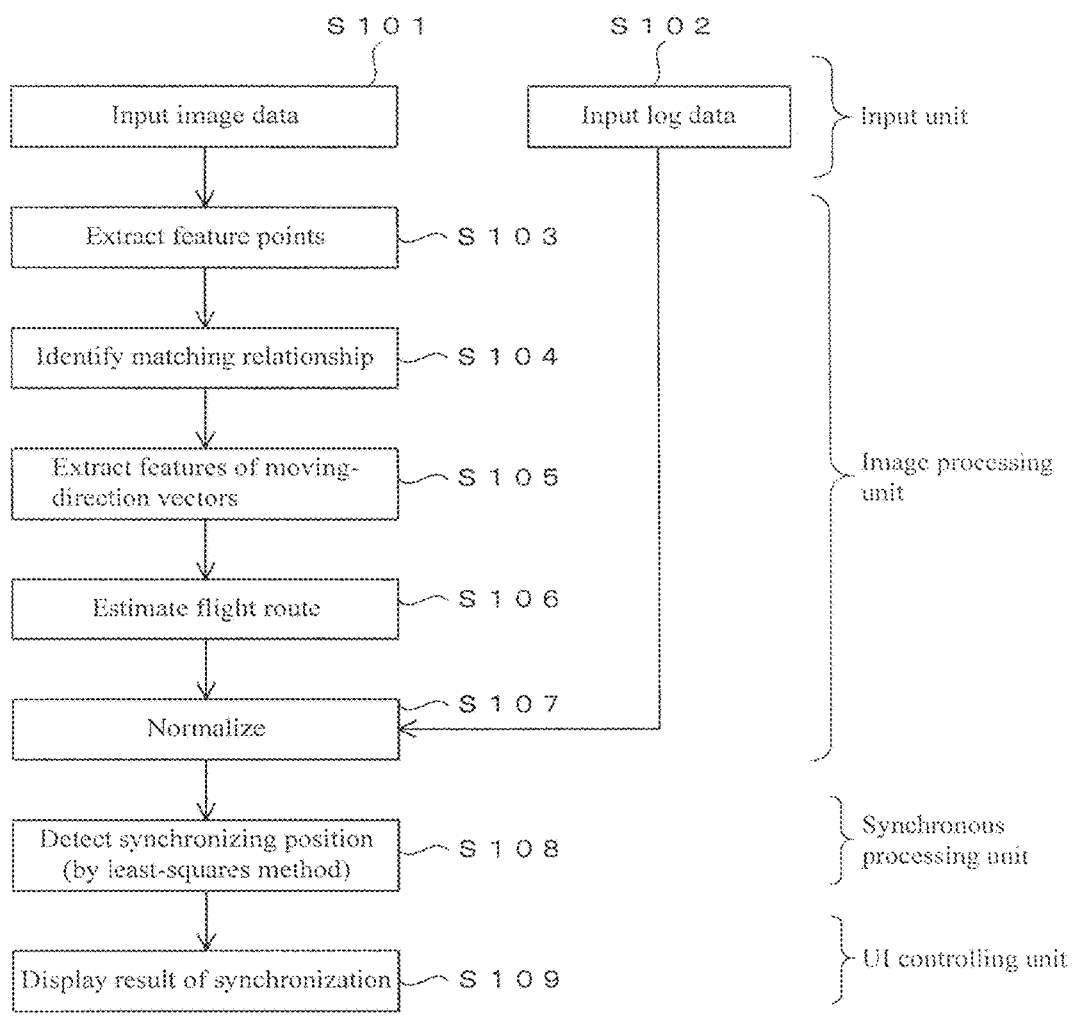
FIG. 6 is a flow chart showing an example of a processing procedure.

FIG. 6 shows an example of a processing procedure. When the processing is started, image data is input (step S101), and the log data is also input (step S102). After the image data is input, feature points are extracted in each of the still images (step S103). The processing of this step is performed by the feature point extracting unit 111 shown in FIG. 2. After the feature points are extracted, the feature points, which match between still images that are photographed in a consecutive manner, are identified (step S104). The processing of this step is performed by the matching point identifying unit 112.

After the matching points are identified, features of moving-direction vectors are extracted by using the method exemplified in FIG. 5 (step S105). The processing of this step is performed by the moving-direction vector feature extracting unit moving direction vector feature extracting unit 113 shown in FIG. 2. Next, the procedure advances to step S106, and a flight route of the UAV is calculated based on the moving-direction vectors in accordance with the principle shown in the lower side in FIG. 5. The processing of this step is performed by the flight route estimating unit 114 shown in FIG. 2.

After the flight route is estimated, a normalizing processing (step S107) is performed, whereby the scale of the flight route, which is obtained from the log data 102, and the scale of the flight route, which is estimated in step S106, are made to correspond with each other. Then, the estimated flight route is in parallel moved, rotated, enlarged, or reduced, so as to match with the flight route obtained from the log data 102 (step S108). The matching is performed by the least-squares method.

In the processing of this step, the location of the estimated flight route is calculated by the least-squares method so that the total of distances between the vectors for indicating the estimated flight route, which is obtained by the method shown in FIG. 5, and the vectors for indicating the flight route, which is obtained from the log data, will be minimum. Naturally, the estimated flight route and the flight route obtained from the log data may be matched with each other by another method. By performing step S108, survey data, in which the photographed multiple still images are linked with the flight route that is obtained by the UAV, is obtained. The survey data is stored in the storing unit 106 shown in FIG. 1.

By matching the flight route, which is obtained from the log data 102, with the flight route, which is estimated in step S106, the corresponding relationship between the flight route and the photographed still images is determined. As a result, the GUI images as exemplified in FIGS. 9 to 14 can be displayed (step S109).

FIGS. 9 to 14 will be described hereinafter. Selected locations W, which were selected prior to the flight, and an actual flight route obtained from the log data, are shown on the right side in FIG. 9. On the other hand, a still image (expected to having been photographed at the location) corresponding to the location, which is selected in the flight route on the right side by the cloverleaf-shaped marker, is shown on the left side in FIG. 9.

An actual flight route obtained from the log data is shown on the right side in FIG. 10. Here, the arrow marked points correspond to the locations where the still images were photographed, respectively. When the operator selects the arrow mark, the selected point is changed into a cloverleaf-shaped marker, and a corresponding still image is shown on the left side. At this time, an arrow for indicating the direction (flight direction) of the UAV is shown in the still image on the left side. The same processing is also performed in the case shown in FIGS. 11 to 14.

Figure 7:
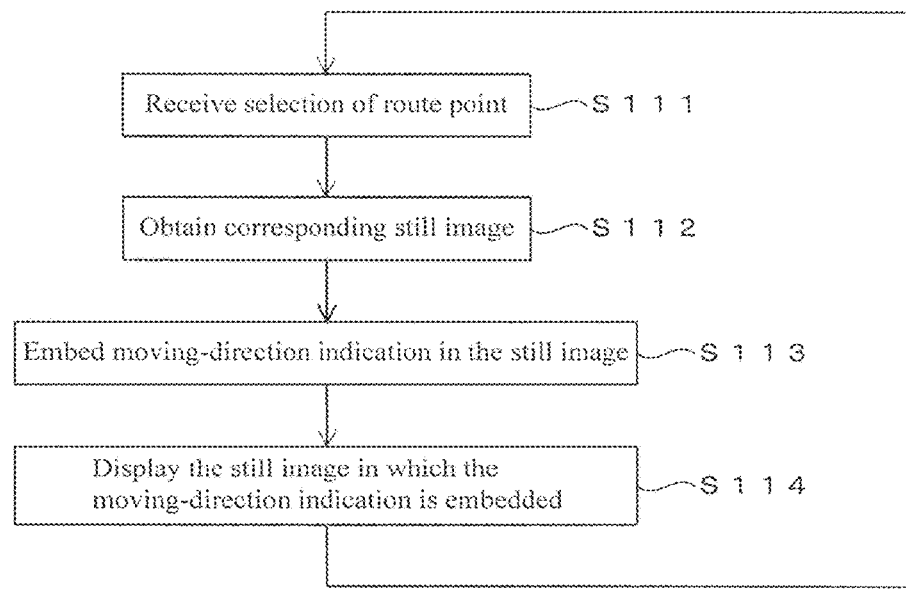
FIG. 7 is a flow chart showing an example of a processing procedure.

An example of a processing procedure relating to FIGS. 10 to 14 will be described below. Here, FIG. 10 is described as a typical example. FIG. 7 shows an example of the processing procedure in this case. First, as a preparation, the processing shown in FIG. 6 is performed, and the image data and the log data are synchronized (matched).

When the operator selects a specific photographing location (specific arrow marked position) of the flight route on the right side in the GUI image in FIG. 10 (step S111), a corresponding still image is obtained (step S112). The processing of step S111 is performed by the route point selection receiving unit 121 shown in FIG. 3, and the processing of step S112 is performed by the corresponding still image obtaining unit 122 shown in FIG. 3.

After step S112, the procedure advances to step S113, and a processing for embedding an arrow (moving-direction indication) in the still image obtained in step S112 for indicating the flight direction of the UAV is performed. This processing is performed by the moving-direction indication embedding unit 123 shown in FIG. 3. Next, the procedure advances to step S114, and a processing for displaying the still image, in which the arrow (moving-direction indication) for indicating the flight direction of the UAV is embedded, on the display 104 shown in FIG. 1. This processing is performed by the display controlling unit 124 shown in FIG. 3.

Although it depends on the performances of the GNSS unit and the IMU equipped on the UAV, the log data obtained by the UAV contains a margin of error in most cases. In particular, when a device of low cost type is used, this tendency increases. In addition, the interval of obtaining the location information by the UAV does not necessarily coincide with the photographing interval of the camera. When general-use products are used together, there may be cases in which the time information of the log data differs from the time information of the image data, in the first place. Therefore, there may be cases in which the location selected by the operator does not correspond to the still image shown on the left side in FIG. 10. That is, there is a possibility that the matching is not perfectly performed, and therefore, a still image, which is different from a still image photographed at the selected location by several frames (a still image photographed at a location that is slightly different from the selected location), may be selected and displayed.

By using the images shown in FIGS. 10 to 14, such a frame shift is detected. In this case, the shift can be corrected manually by the operator. The detection of the shift is performed as follows. As shown in FIGS. 10 to 14, the operator selects a flight location along the flight route and confirms the still image shown on the left side at the same time. At this time, an arrow for indicating the flight direction of the UAV is shown in the still image. In addition, a moving distance from the location, at which a preceding still image was photographed, is added to the arrow.

Figure 11:
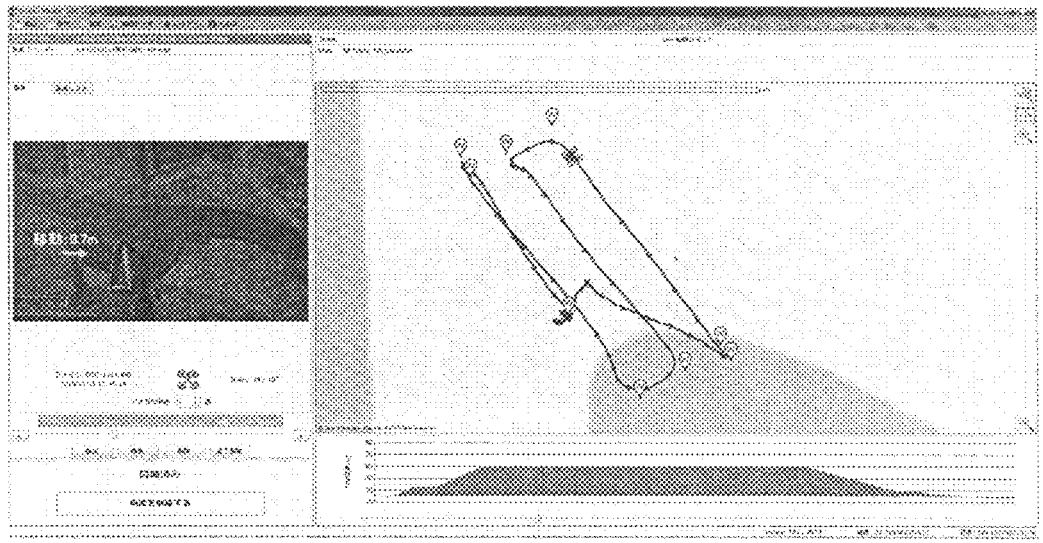
FIG. 11 is a view showing an example of a GUI image displayed on a screen.
Figure 12:
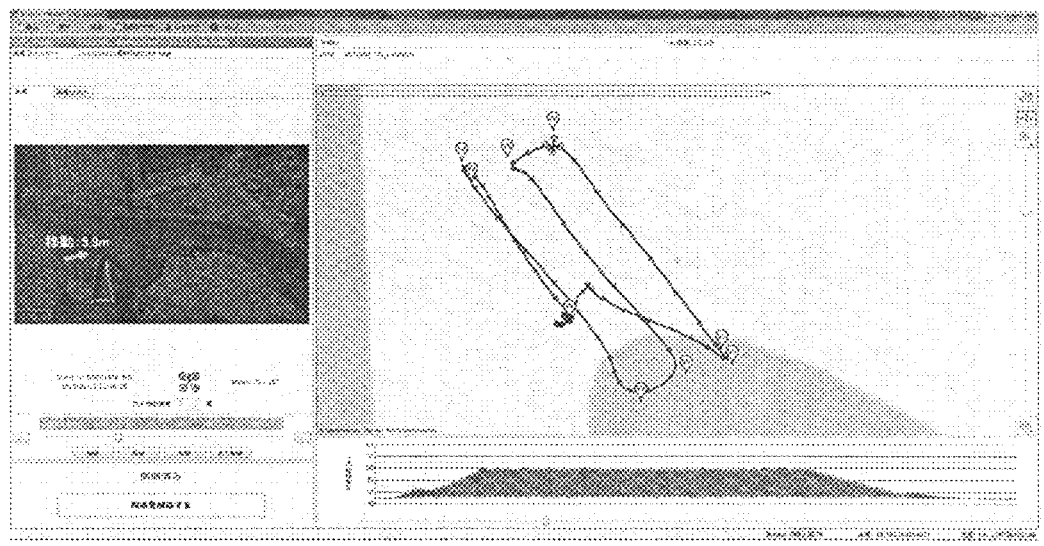
FIG. 12 is a view showing an example of a GUI image displayed on a screen.
Figure 13:
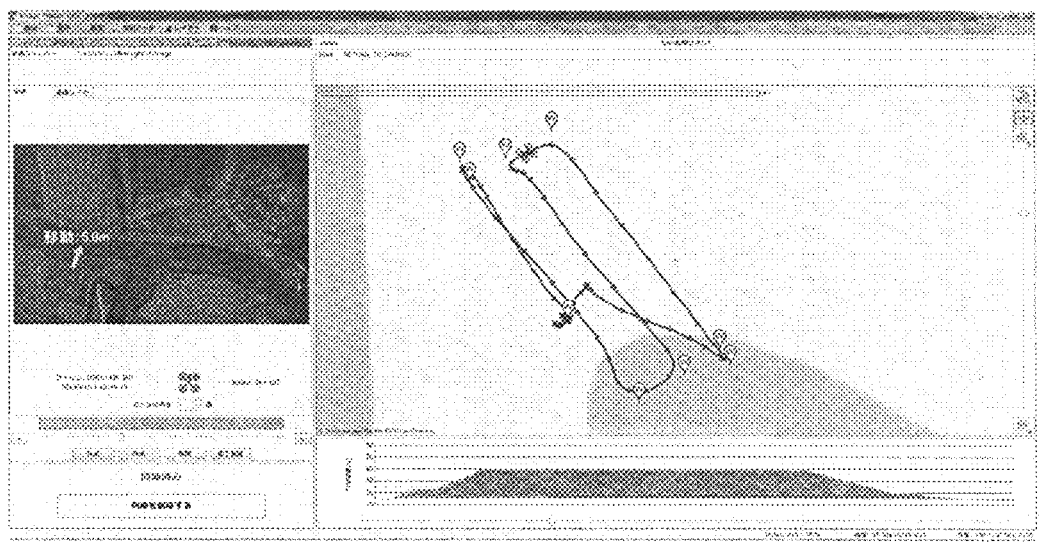
FIG. 13 is a view showing an example of a GUI image displayed on a screen.
Figure 14:
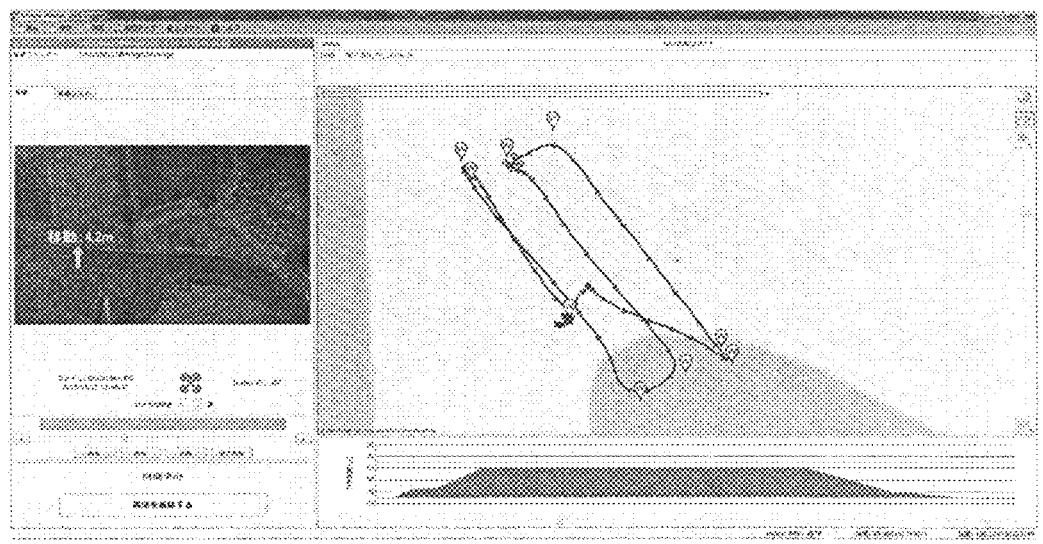
FIG. 14 is a view showing an example of a GUI image displayed on a screen.

By looking at the changes from FIG. 11 to FIG. 12 and then from FIG. 12 to FIG. 13, change in the direction of the arrow shown in the still image according to the turn of the UAV is observed. By comparing the change in the route on the right side with the change in the direction of the arrow in the still image on the left side at turning, the correctness of the corresponding relationship between the flight route and the still image is examined. For example, if the direction of the UAV is clearly changed in the flight route on the right side, but no change in the direction of the arrow can be recognized in the still image on the left side, between two timings that are consecutive or close to each other, mismatch of the relationship between the flight route and the still image is known. In addition, the mismatched direction is known from the difference between the timings when the change appears in the flight route and the still image, respectively.

For example, when the GUI images shown in FIGS. 11 to 14 are displayed in the time sequence order, a change in the direction of the arrow in the still image on the left side may be observed slightly after a change in the direction of the UAV is observed in the flight route on the right side. In this case, a still image, which is photographed at a location subsequent to the actual location in the fight route, is made to correspond to the flight route incorrectly. In this case, by shifting the corresponding relationship by the corresponding amount of the time shift, a corrected corresponding relationship between the image data and the log data is obtained.

The above operation can be visually performed by using the GUI. If costly devices are used, data, in which the corresponding relationship between the image data and the log data is specified correctly, may be obtained. However, a camera, a GNSS unit, and an IMU, of high cost types, are not only expensive, but are large in dimensions, in weight, and in electric power consumption. As a result, an expensive and large UAV is required correspondingly, which is undesirable.

By using the technique of this embodiment, the image data and the log data can be synchronized with each other even when hardware of a low cost type is used. Moreover, even when there is a shift in the synchronized data, the shift can be corrected by using the GUI images as shown in FIGS. 10 to 14 by easy operation.

What is claimed is:

1. A survey data processing device comprising:
circuitry configured to:
receive flight data including a first flight route of a mobile body in flight that is measured by a satellite-based navigation system;
receive image data of multiple still images that are photographed from the mobile body in flight, wherein the multiple still images include a first still image that is photographed at a first time and a second still image that is photographed at a second time that is temporally consecutive and proximate to the first time;
calculate an image matching relationship between the first still image and the second still image based on a cross-correlation function by: (i) determining a template image of $N_1 \times N_1$ pixels from one of the first still image and the second still image; (ii) overlaying the template image on a search range $(M_1-N_1+1)^2$ within an other one of the first still image and the second still image of $M_1 \times M_1$ pixels, which is larger than the template image; and (iii) determining a position of the template image where a value of the cross-correlation function corresponds to a maximum correlation degree;
identify a first feature point from the first still image and a second feature point from the second still image based on the matching relationship, wherein the first feature point and the second feature point correspond to a same geographic feature point that is captured by the first still image and the second still image;
estimate a second flight route of the mobile body based on a moving-direction vector connecting a first position of the first feature point on a screen and a second position of the second feature point on the screen; and
specify a flight route matching relationship regarding position and time between the first flight route acid the second flight route by matching the second flight route onto the first flight route, and wherein the cross-correlation function is calculated based on:

$$C(a,b) = \sum_{m_1=0}^{N_1-1}\sum_{n_1=0}^{N_1-1} \frac{\{I_{(a,b)}(m_1,n_1)-1\}\{T(m_1,n_1)-T\}}{\sqrt{I_{\sigma ab}T_\sigma}}$$

$$\text{Here, } \bar{I} = \frac{1}{N_1^2}\sum_{m_1=0}^{N_1-1}\sum_{n_1=0}^{N_1-1} I_{(a,b)}(m_1,n_1)$$

$$\bar{T} = \frac{1}{N_1^2}\sum_{m_1=0}^{N_1-1}\sum_{n_1=0}^{N_1-1} T(m_1,n_1)$$

$$I_{\sigma ab} = \frac{1}{N_1^2}\sum_{m_1=0}^{N_1-1}\sum_{n_1=0}^{N_1-1} \{I_{(a,b)}(m_1,n_1)-\bar{I}\}^2$$

$$T_\sigma = \frac{1}{N_1^2}\sum_{m_1=0}^{N_1-1}\sum_{n_1=0}^{N_1-1} \{T(m_1,n_1)-\bar{T}\}^2,$$

wherein C(a,b) is the value of the cross-correlation function, I(a,b)(m1,n1) corresponds to the one of the first still image and the second still image and T(m1,n1) corresponds to the template image.

2. The survey data processing device according to claim 1, wherein the circuitry is further configured to calculate the second flight route so that a difference that is to be generated when two kinds of vectors are overlapped will be minimum between vectors for indicating the second flight route and vectors indicating the first flight route.

3. A survey data processing method comprising:
receiving flight data including a first flight route of a mobile body in flight that is measured by a satellite-based navigation system;
receiving image data of multiple still images that are photographed from the mobile body in flight, wherein the multiple still images include a first still image that is photographed at a first time and a second still image that is photographed at a second time that is temporally consecutive and proximate to the first time;
calculating an image matching relationship between the first still image and the second still image based on a cross-correlation function by: (i) determining a template image of $N_1 \times N_1$ pixels from one of the first still image and the second still image; (ii) overlaying the template image on a search range $(M_1-N_1+1)^2$ within an other one of the first still image and the second still image of $M_1 \times M_1$ pixels, which is larger than the template image; and (iii) determining a position of the template image where a value of the cross-correlation function corresponds to a maximum correlation degree;
identifying a first feature point from the first still image and a second feature point from the second still image based on the matching relationship, wherein the first feature point and the second feature point correspond to a same geographic feature point that is captured by the first still image and the second still image;
estimating a second flight route of the mobile body based on a moving-direction vector connecting a first position of the first feature point on a screen and a second position of the second feature point on the screen; and
specifying a flight route matching relationship regarding position and time between the first flight route the second flight route by matching the second flight route onto the first flight route, and wherein the cross-correlation function is calculated based on:

$$C(a,b) = \sum_{m_1=0}^{N_1-1}\sum_{n_1=0}^{N_1-1} \frac{\{I_{(a,b)}(m_1,n_1)-1\}\{T(m_1,n_1)-T\}}{\sqrt{I_{\sigma ab}T_\sigma}}$$

$$\text{Here, } \bar{I} = \frac{1}{N_1^2}\sum_{m_1=0}^{N_1-1}\sum_{n_1=0}^{N_1-1} I_{(a,b)}(m_1,n_1)$$

-continued $$\overline{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \overline{I}\}^2$$

$$T_\sigma = \frac{1}{N_1^2} \sum_{m_1=0}^{N_1-1} \sum_{n_1=0}^{N_1-1} \{T(m_1, n_1) - \overline{T}\}^2,$$

wherein C(a,b) is the value of the cross-correlation function, I(a,b)(m1,n1) corresponds to the one of the first still image and the second still image and T(m1,n1) corresponds to the template image.

4. A non-transitory computer-readable medium storing computer-executable program codes, the computer-executable program codes comprising program code instructions for:
receiving flight data including a first flight route of a mobile body in flight that is measured by a satellite-based navigation system;
receiving image data of multiple still images that are photographed from the mobile body in flight, wherein the multiple still images include a first still image that is photographed at a first time and a second still image that is photographed at a second time that is temporally consecutive and proximate to the first time;
calculating an image matching relationship between the first still image and the second still image based on a cross-correlation function by: (i) determining a template image of $N_1 \times N_1$ pixels from one of the first still image and the second still image; (ii) overlaying the template image on a search range $(M_1-N_1+1)^2$ within an other one of the first still image and the second still image of $M_1 \times M_1$ pixels, which is larger than the template image; and (iii) determining a position of the template image where a value of the cross-correlation function corresponds to a maximum correlation degree;
identifying a first feature point from the first still image and a second feature point from the second still image based on the matching relationship, wherein the first feature point and the second feature point correspond to a same geographic feature point that is captured by the first still image and the second still image;
estimating a second flight route of the mobile body based on a moving-direction vector connecting a first position of the first feature point on a screen and a second position of the second feature point on the screen; and
specifying a flight route matching relationship regarding position and time between the first flight route and the second flight route by matching the second flight route onto the first flight route, and wherein the cross-correlation function is calculated based on:

$$C(a, b) = \sum_{m_1=0}^{N_1-1} \sum_{n_1=0}^{N_1-1} \frac{\{I_{(a,b)}(m_1, n_1) - \overline{I}\}\{T(m_1, n_1) - \overline{T}\}}{\sqrt{I_{\sigma ab} T_\sigma}}$$

$$\text{Here, } \overline{I} = \frac{1}{N_1^2} \sum_{m_1=0}^{N_1-1} \sum_{n_1=0}^{N_1-1} I_{(a,b)}(m_1, n_1)$$

$$\overline{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \overline{I}\}^2$$

$$T_\sigma = \frac{1}{N_1^2} \sum_{m_1=0}^{N_1-1} \sum_{n_1=0}^{N_1-1} \{T(m_1, n_1) - \overline{T}\}^2,$$

wherein C(a,b) is the value of the cross-correlation function, I(a,b)(m1 n1) corresponds to the one of the first still image and the second still image, and T(m1,n1) corresponds to the template image.

5. The survey data processing device according to claim 1, wherein matching the second flight route onto the first flight route includes matching a scale of the second flight route with the first flight route by moving, rotating, enlarging, or reducing the second flight route.

6. The survey data processing device according to claim 5, wherein matching the scale of the second flight route with the first flight route is performed by a least-squares method.

* * * * *